Oct. 2, 1962 A. ROSENFELD ET AL 3,056,905
PROTECTIVE SYSTEM FOR TRANSISTORS
Filed Aug. 1, 1958
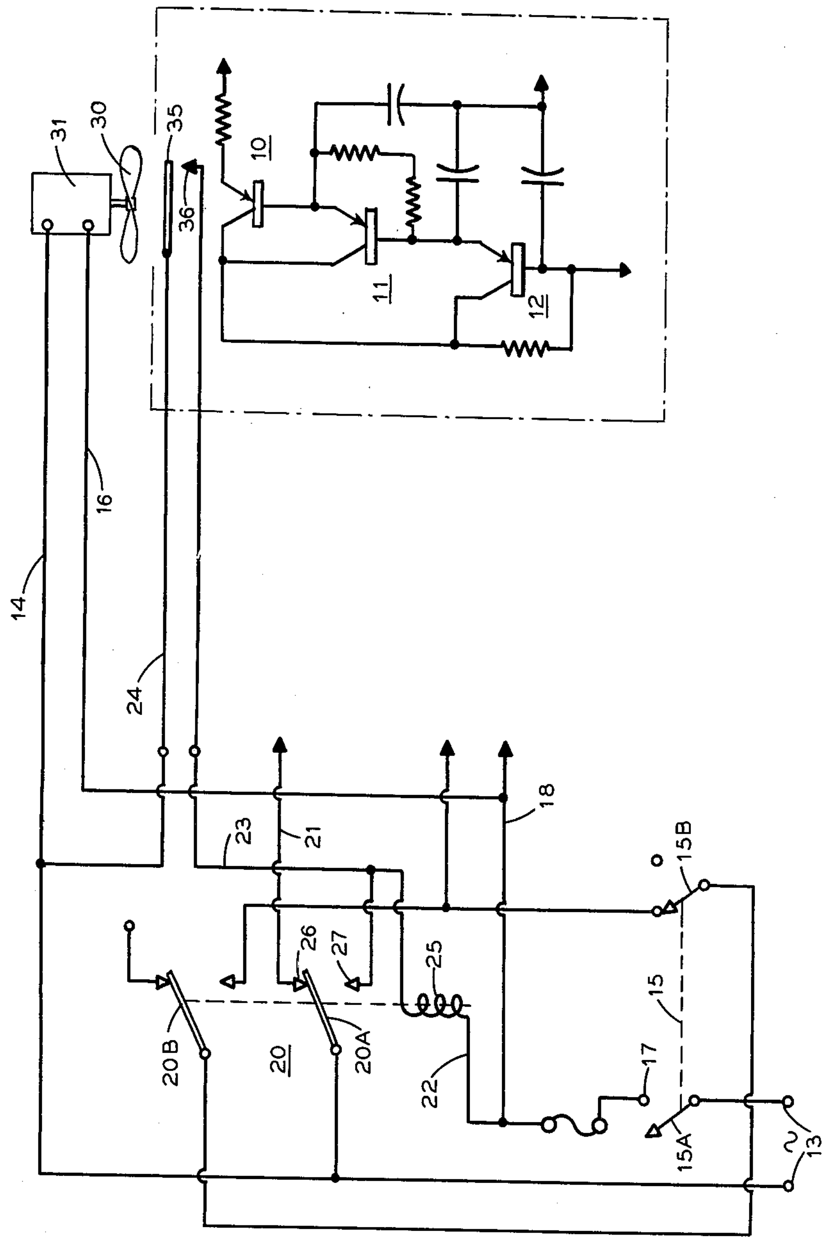
INVENTORS
Aaron Rosenfeld
Kenneth Kupferberg
BY
ATTORNEY 3,056,905

PROTECTIVE SYSTEM FOR TRANSISTORS

Aaron Rosenfeld, Jackson Heights, and Kenneth Kupferberg, Flushing, N.Y., assignors to Forbro Design Inc., New York, N.Y., a corporation of New York Filed Aug. 1, 1958, Ser. No. 752,596
8 Claims. (Cl. 317—40)

This invention relates to transistorized electronic equipment and, more particularly, to a novel system for preventing damage to transistors due to failure of cooling means for the equipment.

Transistors are very susceptible to damage due to excessive temperature. For this reason, transistorized equipment is generally provided with a cooling system, particularly where there is a likelihood of high temperatures being developed in the operation of the equipment. However, there is always the possibility of failure of the cooling system to properly control the temperature of the equipment. Such failure may result, for example, from fan stoppage, blocking of intake or exhaust ports, operation of the equipment at an ambient temperature too high for the capacity of the cooling system, and other reasons. This makes it desirable to provide special precautions to prevent transistor damage due to failure of the cooling system.

In accordance with the present invention, such a protective system comprises a thermostat or other suitable temperature sensitive device adjacent the transistor most likely to overheat. When this thermostat operates, as by virtue of a predetermined increase in temperature, it closes a self-latching relay which shuts off the power input to the equipment while maintaining the cooling system in operation. The circuit connections are so arranged that the equipment may be re-energized only by disconnecting the equipment from the power input and re-connecting it thereto. If, at the time the equipment is reconnected, the thermostat has cooled sufficiently, the equipment will be re-energized. However, if the cooling during the interval of "power-off" is insufficient to de-activate the thermostat, the equipment cannot be re-energized until the ambient temperature has dropped sufficiently to deactivate the thermostat.

For an understanding of the invention principles, reference is made to the following description of a typical embodiment thereof as illustrated in the accompanying drawing. In the drawing, the single FIGURE is a schematic wiring diagram of part of a transistorized power supply equipment embodying the invention.

Referring to the drawing, a transistorized power supply is schematically indicated as including transistors such as 10, 11 and 12. Transistor 10 carries the full output current of the supply and is therefore the transistor most likely to operate at the highest temperature. Transistors 11 and 12 are control transistors.

Although the actual circuit interconnections have been omitted, as forming no part of the present invention and to simplify and clarify the illustration of the invention, the transistors are supplied with operating potentials derived from an input potential applied to input terminals 13 connected to a two-pole, double-throw main control switch 15 and a relay 20 controlling energization of the power supply.

The cooling system for the power supply is illustrated schematically as a fan 30 operated by a motor 31. For a purpose to be described, a temperature sensitive detector, shown as a bi-metallic strip 35 cooperable with a contact 36, is located in heat transfer relation with transistor 10. When the ambient temperature at transistor 10 exceeds a pre-set value, strip 35 deflects to engage contact 36.

The arrangement is such that, upon deflection of strip 35 to engage contact 36, relay 20 is energized and held energized to cut off the input power to the power supply while maintaining fan motor 31 energized. In order to re-energize the power supply, switch 15 must first be opened and then re-closed to drop relay 20. However, if the ambient temperature at transistor 10 is still above the pre-set value, strip 35 remains in engagement with contact 36 and immediately re-closes relay 20 to cut the input to the power supply.

More particularly, one input terminal 13 is connected by conductor 14 to one terminal of fan motor 31, and the other motor terminal is connected by conductor 16 to switch contact 17 engageable by switch blade 15A connected to the other input terminal 13. A power lead 18 for the power supply is branched from conductor 16. The other power lead 21 for the power supply is connected through relay armature 20A to conductor 14. Hence, when switch 15 is closed and relay 20 is unenergized, power is supplied from terminals 13 to power leads 18 and 21, and thus to the power supply including transistors 10, 11 and 12.

Conductor 22 connects one end of relay coil 25 through a fuse to switch contact 17, and a conductor 23 connects the other end of coil 25 to contact 36. Thermomotive strip 35 is connected to conductor 14 by conductor 24. When relay armature 20A engages its front contact, it connects such other end of relay coil 25 to conductor 14.

The arrangement operates as follows. To energize the power supply, switch 15 is closed. One terminal 13 is connected to power supply conductor 21 through relay armature 20A, and the other terminal 13 is connected to power supply conductor 18 through switch blade 15A engaging contact 17. Fan motor 31 is energized over conductors 14, 16, switch blade 15A and contact 17. The power supply is now activated, and its components, including transistors 10, 11, 12, are cooled by fan 30.

Should the ambient temperature at transistor 10 exceed the pre-set value, relay 20 is energized as follows: one terminal 13, conductors 14, 24, strip 35 deflected to engage contact 36, conductor 23, coil 25, conductor 22, conductor 16, contact 17, switch blade 15A, and the other terminal 13. Relay armature 20A disengages its back contact 26, disconnecting power supply conductor 21 from conductor 14, and engages its front contact 27 to close a holding circuit for relay 20 in parallel with strip 35 and contact 36. Power is cut off from the power supply components at relay contact 26, but fan motor 31 remains energized over conductors 14 and 16.

Should strip 35 cool enough to disengage contact 36, the input power to the power supply is not restored as relay 20 remains closed over its holding circuit. To restart the power supply, it is first necessary to open switch 15, which breaks the relay holding circuit. Upon reclosing of switch 15, relay 20 remains deenergized if strip 35 has disengaged contact 36 by virtue of cooling below the pre-set temperature. If sufficient cooling has not taken place, relay 20 is again picked up and holds to shut off the power. Thus, the power supply cannot be reenergized until the temperature at transistor 10 is below the pre-set value.

While a specific embodiment of the invention has been shown and described in detail to illustrate the application of the invention principles, it will be understood that the invention may be embodied otherwise without departing from such principles.

What is claimed is:

1. In a power supply including electronic components one of which is more subject to overheating than the others, a pair of input terminals connected to a source of input potential, input supply conductor means for the power supply, and a main control switch operable, when closed, to connect said input supply conductor means to the input terminals to apply operating potential to said electronic components; an electrically energized cooling system for the power supply connected by said main control switch to said input terminals independently of said supply conductor means; switch means operable, when activated, to disconnect said supply conductor means from said control switch; and temperature sensitive detector means positioned in heat transfer relation with said one electronic component and operable, when the ambient temperature thereof exceeds a pre-set value, to activate said switch means; said switch means, when activated, remaining activated until said main control switch is opened; said cooling system remaining energized as long as said main control switch is closed to reduce the ambient temperature to at least said pre-set value.

2. In a power supply including electronic components one of which is more subject to overheating than the others, a pair of input terminals connected to a source of input potential, input supply conductor means for the power supply, and a main control switch operable, when closed, to connect said input supply conductor means to the input terminals to apply operating potential to said electronic components; an electrically energized cooling system for the power supply connected by said main control switch to said input terminals independently of said supply conductor means; switch means operable, when activated, to disconnect said supply conductor means from said control switch; and temperature sensitive detector means positioned in heat transfer relation with said one electronic component and operable, when the ambient temperature thereof exceeds a pre-set value, to activate said switch means; said switch means, when activated, remaining activated until said main control switch is opened; said cooling system remaining energized as long as said main control switch is closed to reduce the ambient temperature to at least said pre-set value and being activated whenever said main control switch is closed and said detector means is operated by such ambient temperature exceeding such pre-set value.

3. In a power supply including transistors one of which is more subject to overheating than the others, a pair of input terminals connected to a source of input potential, input supply conductor means for the power supply, and a main control switch operable, when closed, to connect said input supply conductor means to the input terminals to apply operating potential to said transistors; an electrically energized cooling system for the power supply connected by said main control switch to said input terminals independently of said supply conductor means; switch means operable, when activated, to disconnect said supply conductor means from said control switch; and temperature sensitive detector means positioned in heat transfer relation with said one transistor and operable, when the ambient temperature thereof exceeds a pre-set value, to activate said switch means; said switch means, when activated, remaining activated until said main control switch is opened; said cooling system remaining energized as long as said main control switch is closed to reduce the ambient temperature to at least said pre-set value.

4. In a power supply including transistors one of which is more subject to overheating than the others, a pair of input terminals connected to a source of input potential, input supply conductor means for the power supply, and a main control switch operable, when closed, to connect said input supply conductor means to the input terminals to apply operating potential to said transistors; an electrically energized cooling system for the power supply connected by said main control switch to said input terminals independently of said supply conductor means; switch means operable, when activated, to disconnect said supply conductor means from said control switch; and temperature sensitive detector means positioned in heat transfer relation with said one transistor and operable, when the ambient temperature thereof exceeds a pre-set value, to activate said switch means; said switch means, when activated, remaining activated until said main control switch is opened; said cooling system remaining energized as long as said main control switch is closed to reduce the ambient temperature to at least said pre-set value and being activated whenever said main control switch is closed and said detector means is operated by such ambient temperature exceeding such pre-set value.

5. In a power supply as claimed in claim 4 in which said detector means comprises a thermomotive switch.

6. In a power supply as claimed in claim 4 in which said switch means is a hold relay including armature means connecting said supply conductor means to said control switch when said relay is deenergized, and disconnecting said supply conductor means from said control switch and closing a hold circuit for said relay when said relay is energized.

7. In a power supply as claimed in claim 4 in which said detector means comprises a thermomotive switch; and said switch means is a hold relay including armature means connecting said supply conductor means to said control switch when said relay is deenergized, and disconnecting said supply conductor means from said control switch and closing a hold circuit for said relay when said relay is energized.

8. In a power supply as claimed in claim 4 in which said detector means comprises a thermomotive switch; and said switch means is a hold relay including armature means connecting said supply conductor means to said control switch when said relay is deenergized, and disconnecting said supply conductor means from said control switch and closing a hold circuit for said relay when said relay is energized; said hold circuit shunting said thermomotive switch and being opened only upon opening of said main control switch.

References Cited in the file of this patent

UNITED STATES PATENTS

| | | |
|---|---|---|
| 1,565,151 | Housekeeper | Dec. 8, 1925 |
| 1,873,837 | Gebhard | Aug. 23, 1932 |
| 1,901,071 | Winograd | Mar. 14, 1933 |
| 2,008,174 | Frank | July 16, 1935 |
| 2,125,110 | Harty | July 26, 1938 |
| 2,480,538 | Barr | Aug. 30, 1949 |
| 2,530,935 | Bock | Nov. 21, 1950 |
| 2,539,206 | Robinson | Jan. 23, 1951 |
| 2,619,521 | Cuttino | Nov. 25, 1952 |
| 2,896,152 | Schwab | July 21, 1959 |